United States Patent
Lagnese et al.

(10) Patent No.: US 10,803,221 B1
(45) Date of Patent: Oct. 13, 2020

(54) SNAP-TO VALID PATTERN SYSTEM AND METHOD

(71) Applicant: PDF Solutions, Inc., San Jose, CA (US)

(72) Inventors: Elizabeth Lagnese, San Jose, CA (US); Jonathan Haigh, San Jose, CA (US)

(73) Assignee: PDF Solutions, Inc., Santa Clara, CA (US)

( * ) Notice: Subject to any disclaimer, the term of this patent is extended or adjusted under 35 U.S.C. 154(b) by 269 days.

(21) Appl. No.: 15/695,933

(22) Filed: Sep. 5, 2017

Related U.S. Application Data

(60) Division of application No. 15/073,493, filed on Mar. 17, 2016, now Pat. No. 9,870,441, which is a continuation-in-part of application No. 14/289,321, filed on May 28, 2014, now abandoned.

(60) Provisional application No. 62/186,677, filed on Jun. 30, 2015, provisional application No. 61/887,271, filed on Oct. 4, 2013.

(51) Int. Cl.
  *G06F 17/50* (2006.01)
  *G06F 30/392* (2020.01)
  *G06F 30/394* (2020.01)

(52) U.S. Cl.
  CPC .......... *G06F 30/392* (2020.01); *G06F 30/394* (2020.01)

(58) Field of Classification Search
  CPC ............ G06F 17/5072; G06F 17/5077; G06F 30/392; G06F 30/394
  USPC .......................................................... 716/119
  See application file for complete search history.

(56) References Cited

U.S. PATENT DOCUMENTS

| | | | |
|---|---|---|---|
| 5,987,086 A | 11/1999 | Raman | |
| 6,701,289 B1 | 3/2004 | Garnett et al. | |
| 7,320,115 B2 | 1/2008 | Kuo | |
| 7,653,890 B2 | 1/2010 | Tsai | |
| 7,696,199 B2 | 4/2010 | Laggner et al. | |
| 8,136,056 B2 | 3/2012 | Scheffer et al. | |
| 8,269,764 B2 | 9/2012 | Ravada | |
| 8,504,972 B2 | 8/2013 | Hou | |
| 2008/0244483 A1* | 10/2008 | Chang | G06F 17/5081 716/106 |
| 2009/0307642 A1* | 12/2009 | Lai | G06F 17/5068 716/106 |
| 2013/0096886 A1 | 4/2013 | Vorobyov | |

* cited by examiner

*Primary Examiner* — Jack Chiang
*Assistant Examiner* — Brandon Bowers
(74) *Attorney, Agent, or Firm* — Pillsbury Winthrop Shaw Pittman LLP

(57) ABSTRACT

Described is a method for implementing a snap to capability that enables the manufactured of a valid pattern in a semiconductor device, based upon an originally invalid pattern.

10 Claims, 20 Drawing Sheets

- Categorized by:
  - Layer
  - Direction
  - Orientation
  - Width
  - Location Vertical line ends:
These line ends match because they are the same width, same distance from their respective top/bottom edges, and both are the closest edge of their rectangle to the cell edge.

No line end at corners (L-shapes)

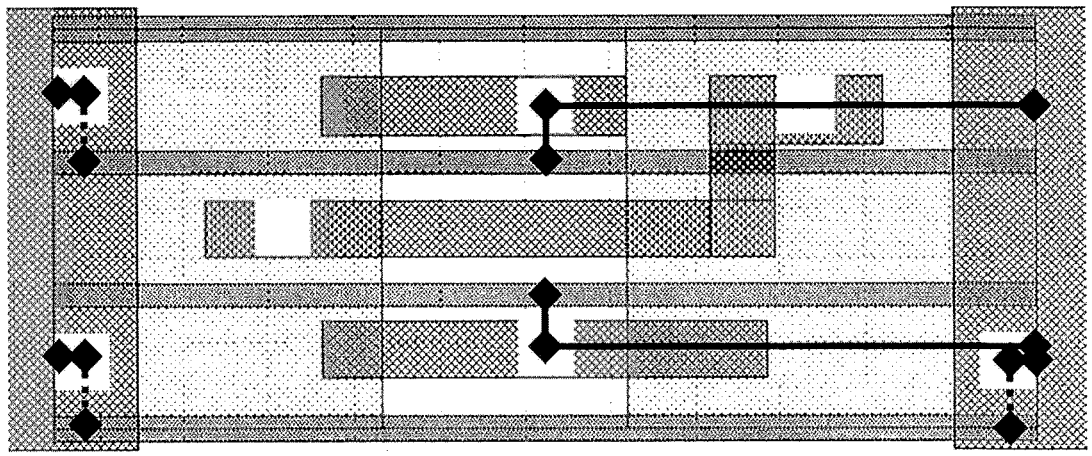
FIG. 6
- Categorized by:
  - X,Y location
- Typically used to specify via locations
- X,Y positions may be measured relative to origin, the cell boundary, or the nearest poly, according to the Template definition
  Using BOUNDARY-relative in y-direction and Poly-relative in X-direction:
   lines mark two identical V0 locations
  lines mark three identical V0 locations $$\text{Selection} = \min[|x_{invalid} - x_{valid}| + |y_{invalid} - y_{valid}|]_{\text{set of valid}}$$

$w_{invalid} - w_{valid} == 0$ && $\min[|x_{invalid} - x_{valid}|]_{set\ of\ valid}$

OR $\min[|w_{invalid} - w_{valid}| + |x_{invalid} - x_{valid}|]_{set\ of\ valid}$ Selection =

$$w_{invalid} - w_{valid} == 0 \,\&\&\, \min[|y_{invalid} - y_{valid}|]_{set\ of\ valid}$$

OR $$\min[|w_{invalid} - w_{valid}| + |y_{invalid} - y_{valid}|]_{set\ of\ valid}$$

Selection =

$$w_{invalid} - w_{valid} == 0 \;\&\&\; \min\left[|e_{invalid} - e_{valid}|\right]_{\text{set of valid}}$$

OR $$\min\left[|w_{invalid} - w_{valid}| + |e_{invalid} - e_{valid}|\right]_{\text{set of valid}}$$

Selection =

SNAP-TO VALID PATTERN SYSTEM AND METHOD

This application is a divisional of U.S. patent application Ser. No. 15/073,493 filed Mar. 17, 2016 which is a continuation-in-part of U.S. patent application Ser. No. 14/289,321 filed May 28, 2014, which claims priority to U.S. Provisional Application No. 61/887,271 filed Oct. 4, 2013. U.S. patent application Ser. No. 15/073,493 also claims priority to U.S. Provisional Application No. 62/186,677 filed Jun. 30, 2015, all of which are expressly incorporated by reference herein.

FIELD OF THE INVENTION

This invention relates to the field of semiconductor integrated circuits and to methods for manufacturing and testing such circuits.

BACKGROUND OF THE INVENTION

Current commercial tools, such as Synopsys' Custom Designer and Cadence's Virtuoso, support custom design of cells. These tools provide an interactive design system in which each polygon is placed individually for the cell.

SUMMARY OF THE INVENTION

Described is a method for implementing a snap to capability that enables the manufacture of a valid pattern in a semiconductor device, based upon an originally invalid pattern.

In one aspect is a method of providing a physical pattern at one of a plurality of layers in a semiconductor integrated circuit, the method comprising the steps of:
creating the physical pattern at the one of the plurality of layers in the semiconductor integrated circuit, the physical pattern corresponding to a valid pattern defined by data; and
snapping an invalid pattern defined by other data into the valid pattern, the step of snapping including determining a valid size and a valid position that approximates an invalid size and an invalid position of the invalid pattern, wherein the valid pattern includes at least a valid size and a valid position, and wherein the valid pattern is obtained based upon a plurality of golden cell valid patterns.

In another aspect is provided a method of creating a snap-to instruction for forming at least one physical pattern on one of a plurality of layers in a semiconductor integrated circuit, the method comprising the steps of:
determining a plurality of golden cell valid patterns, the valid patterns defined by data; and
creating a snap-to instruction that automatically alters an invalid pattern defined by other data into a valid pattern based upon at least one of the plurality of golden cell valid patterns, the snap-to instruction determining a valid size and a valid position that approximates an invalid size and an invalid position of the invalid pattern, wherein the valid pattern includes at least a valid size and a valid position.

BRIEF DESCRIPTION OF THE DRAWINGS

These, as well as other, aspects, features and advantages of the present invention are exemplified in the following set of drawings, in which:
FIG. 6 illustrates Position patterns being distinguished by the x,y position of the center of the shape.

DESCRIPTION OF ILLUSTRATIVE EMBODIMENTS

IC design rules prevent illegal combinations of polygons. Any relationships that are not explicitly prohibited are permitted, allowing for numerous patterns that cannot be verified for manufacturability. Templatyzer is a software-based system executed on a computer using user-inputs as well as databases that include various data, such as golden library of cells described herein, to implement the aspects described herein, and takes the proactive approach of authorizing acceptable patterns, thereby obtaining a valid pattern corresponding to a physical pattern that is manufactured in a resulting semiconductor device. This approach to cell library design minimizes the number of patterns that need to be verified for manufacturability. Instead of using rules, in the Template design approach, sanctioned patterns are designated by their presence in a "golden library" which is a small (15-25) set of cells that contain every allowable pattern. This set of patterns makes up the Template Architecture. Various types of patterns are employed:
Route: width+position of long axis
Line end: width+position of short end of rectangle
Size: height+width
Position: center x,y coordinates
Extension: distance from via to edge of enclosing shape Enclosure: three shortest distances from via to enclosing shape X,Y-properties: center position+height/width, which is a combination of Size and Position types discussed above.

A user modifiable template definition for a specific technology determines which pattern types are relevant for specific layers. Positions may be measured as absolute (relative to the lower left corner of the cell), relative to the closest left/right or top/bottom edge of the cell, or relative to the closest metallic track.

The Templatyzer tool compares the patterns in a single cell or an entire library against the patterns in the Template Architecture. Results are presented visually, and differences can be viewed interactively. Additionally, the user may choose to view similar valid patterns. A description of the Templatyzer tool is provided in the various applications incorporated by reference above.

Templatyzer has been modified from its original implementation as described in U.S. Provisional Application No. 61/887,271 filed Oct. 4, 2013, referenced above, to include a "snap-to" capability that enables it to modify a violating pattern to its closest valid pattern, as further described herein, and with reference to the following figures, and the reference to "snap-to", "snap to" and "snapping" herein is intended to connote that meaning.

Figure 1:
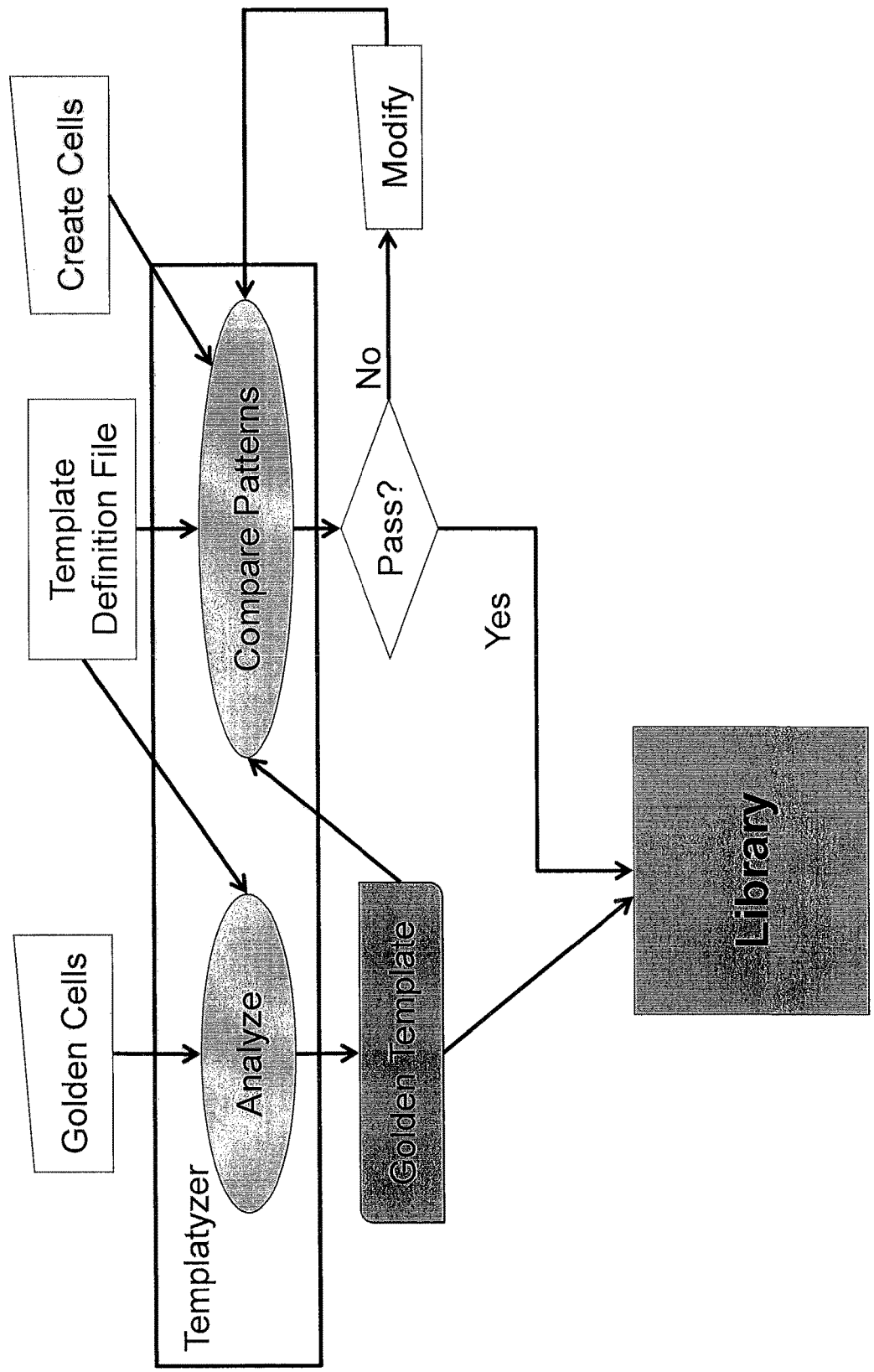
FIG. 1 illustrates the Template based library system implemented through the Templatyzer tool.

FIG. 1: The Template based library system is implemented through the Templatyzer tool. Inputs to the system are a golden library, and a Template Definition File. The golden library is a small set of representative cells (typically 15-25) that employ the full set of patterns in the Template Architecture. The cells form the basis of the library under development. The Template Definition File contains a specification of the types of patterns of interest. Subsequent additions to the library are checked against the patterns exhibited in the golden set, as defined by the Template Definition File. Any new patterns that do not match those in the golden library must be modified to match or added to the golden library.

Figure 2:
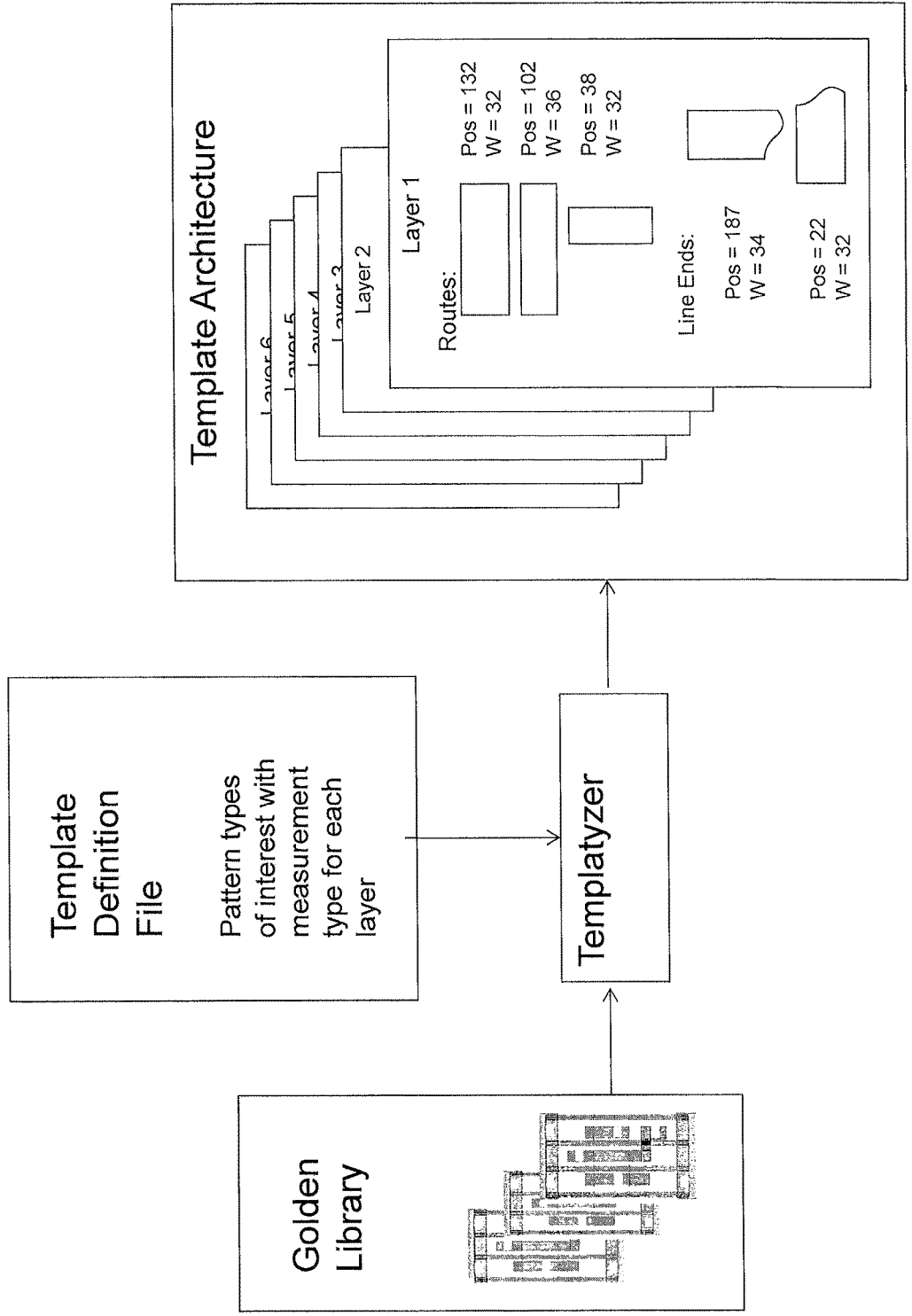
FIG. 2 illustrates the Template Architecture extracted from the golden library.

FIG. 2: The Template Architecture is extracted from the golden library. A Template Definition File specifies the pattern types of interest for each layer. Pattern types include route, line end, size, position, enclosure, extension, and x and y properties.

Figure 3:
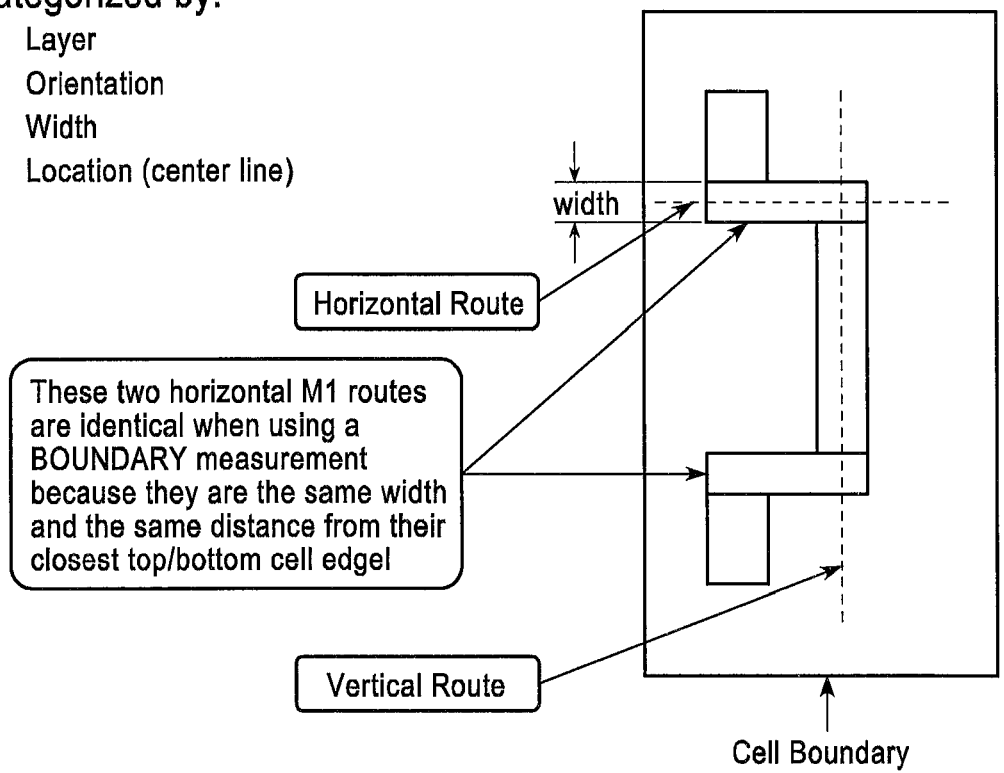
FIG. 3 illustrates route patterns being distinguished by width and long axis position.

FIG. 3: Route patterns are distinguished by width and long axis position, as well as orientation (horizontal or vertical) for a specific layer.

Figure 4:
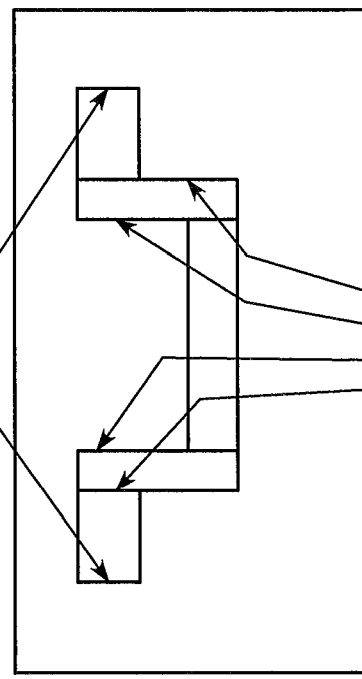
FIG. 4 illustrates Line End patterns being distinguished by width and short-end position.

FIG. 4: Line End patterns are distinguished by width and short-end position, as well as horizontal or vertical orientation of the rectangle, direction and layer. Direction indicates whether the line end is open or closed relative to the origin it is being measured against. Line Ends can be coupled with Routes to fully characterize a rectangle of a given layer.

Figure 5:
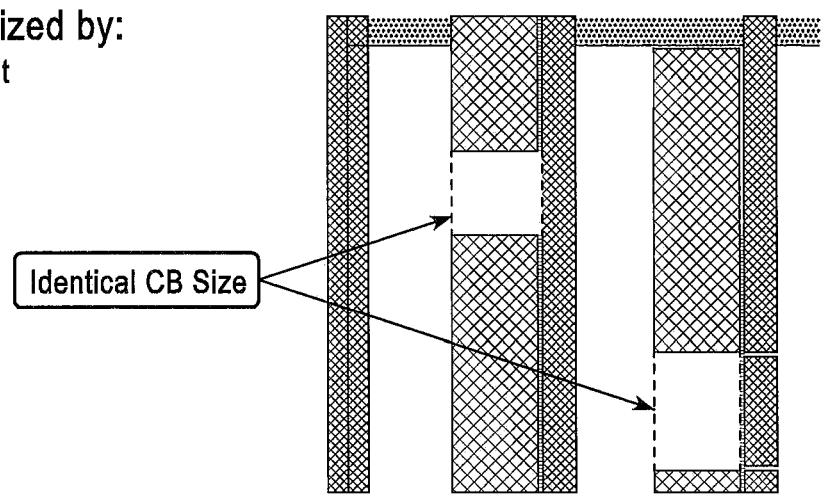
FIG. 5 illustrates Size patterns being distinguished by width and height.

FIG. 5: Size patterns are distinguished by width and height.

FIG. 6: Position patterns are distinguished by the x,y position of the center of the shape. Position patterns can be coupled with size patterns to fully characterize a rectangle of a given layer.

Figure 7:
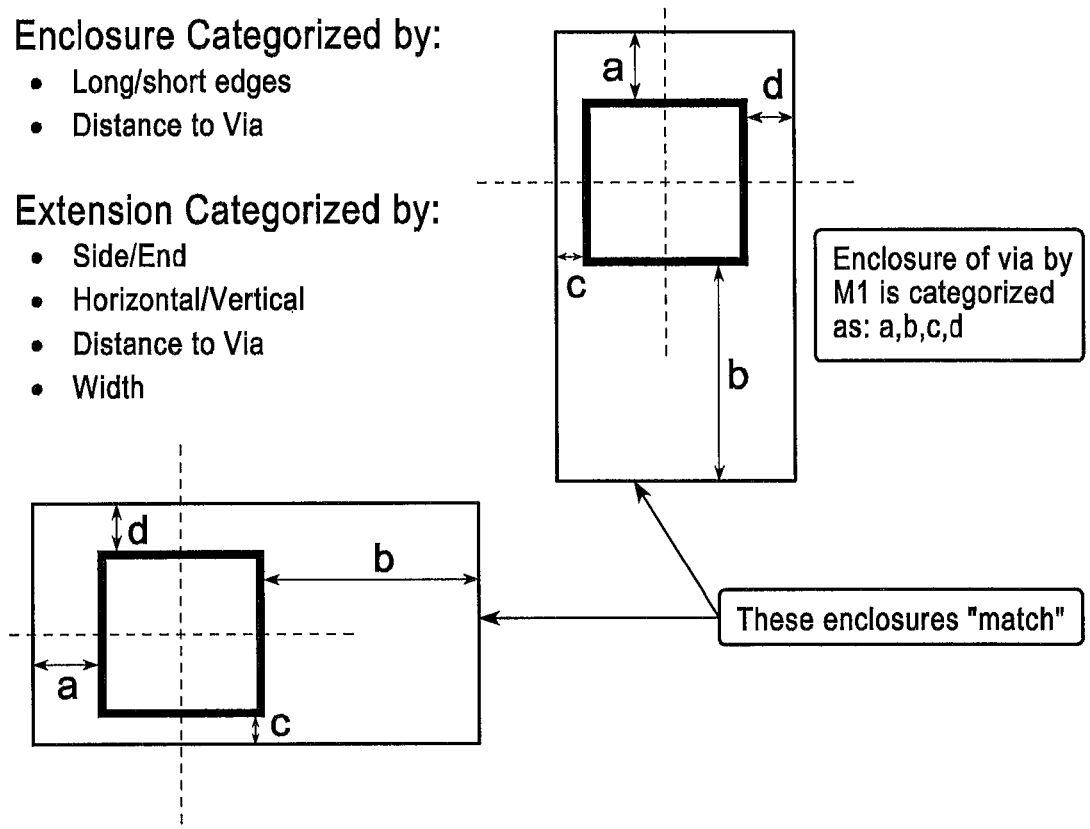
FIG. 7 illustrates Extension and Enclosure patterns being distinguished by the distance between an inner shape and its enclosing shape.

FIG. 7: Extension and enclosure patterns are distinguished by the distance between an inner shape and its enclosing shape. These measures are typically used to characterize vias.

Figure 8:
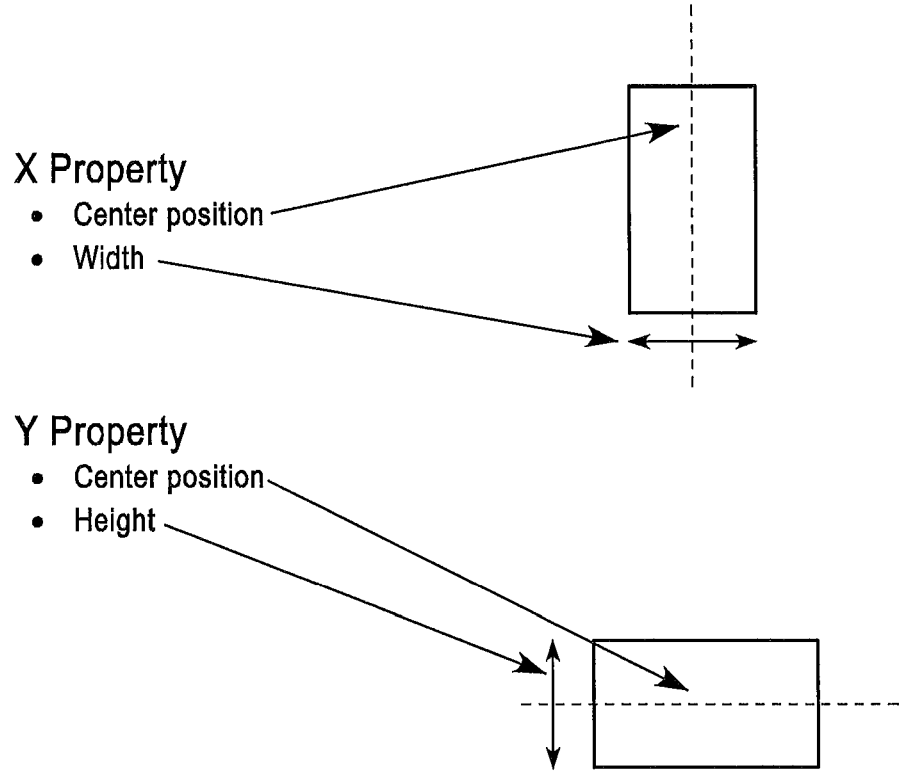
FIG. 8 illustrates X(Y) property patterns being distinguished by X (Y) position of the center and width (height).

FIG. 8: X(Y) property patterns are distinguished by X (Y) position of the center and width (height).

Figure 9:
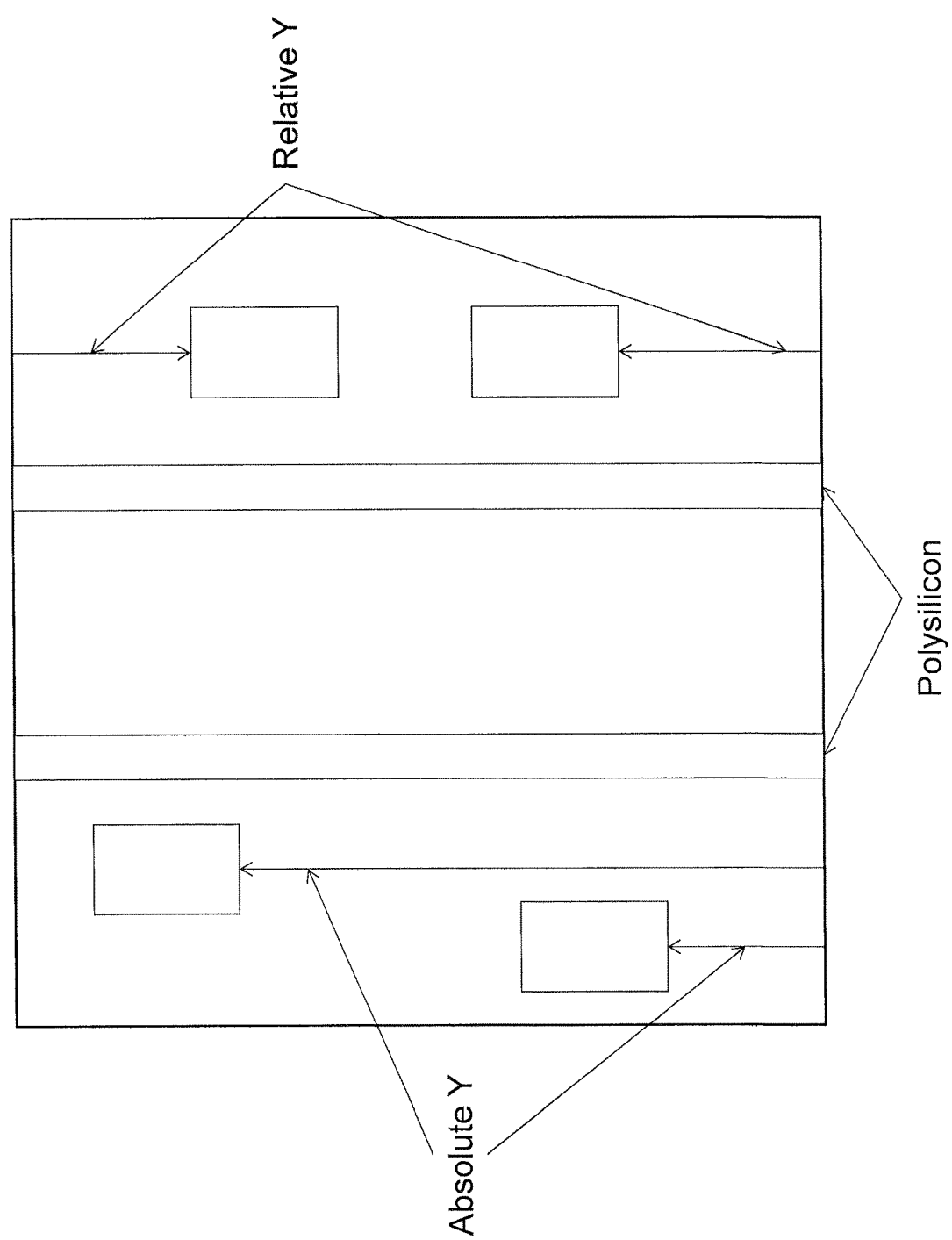
FIG. 9 illustrates Y positions measured as absolute or relative to cell edges, or relative to metallic tracks.
Figure 10:
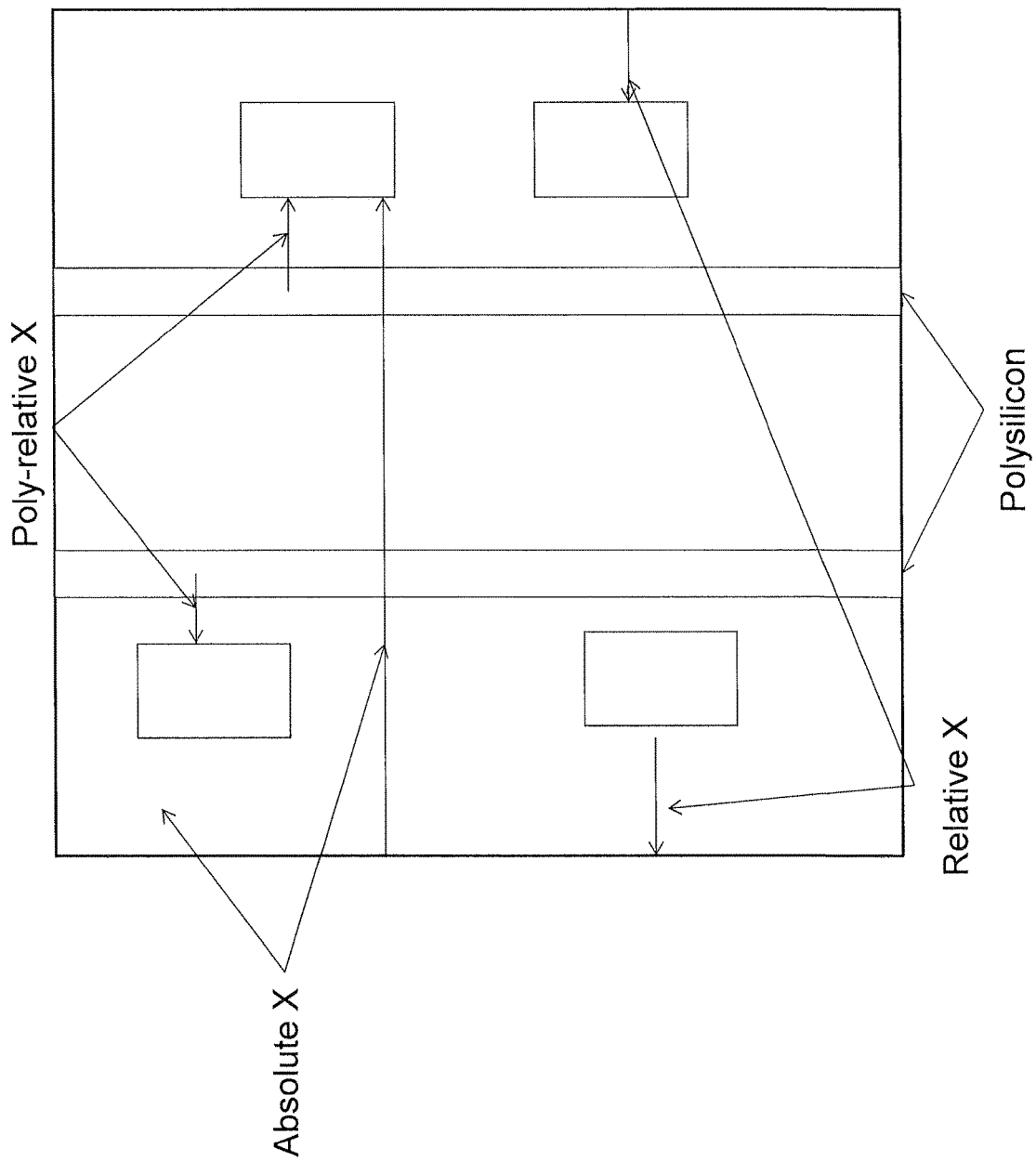
FIG. 10 illustrates X positions measured as absolute, relative to cell edges, or relative to metallic tracks.

FIG. 9: Y positions are measured as absolute or relative to cell edges, or relative to metallic tracks. Patterns FIG. 10: X positions are measured as absolute, relative to cell edges, or relative to metallic tracks.

Figure 11:
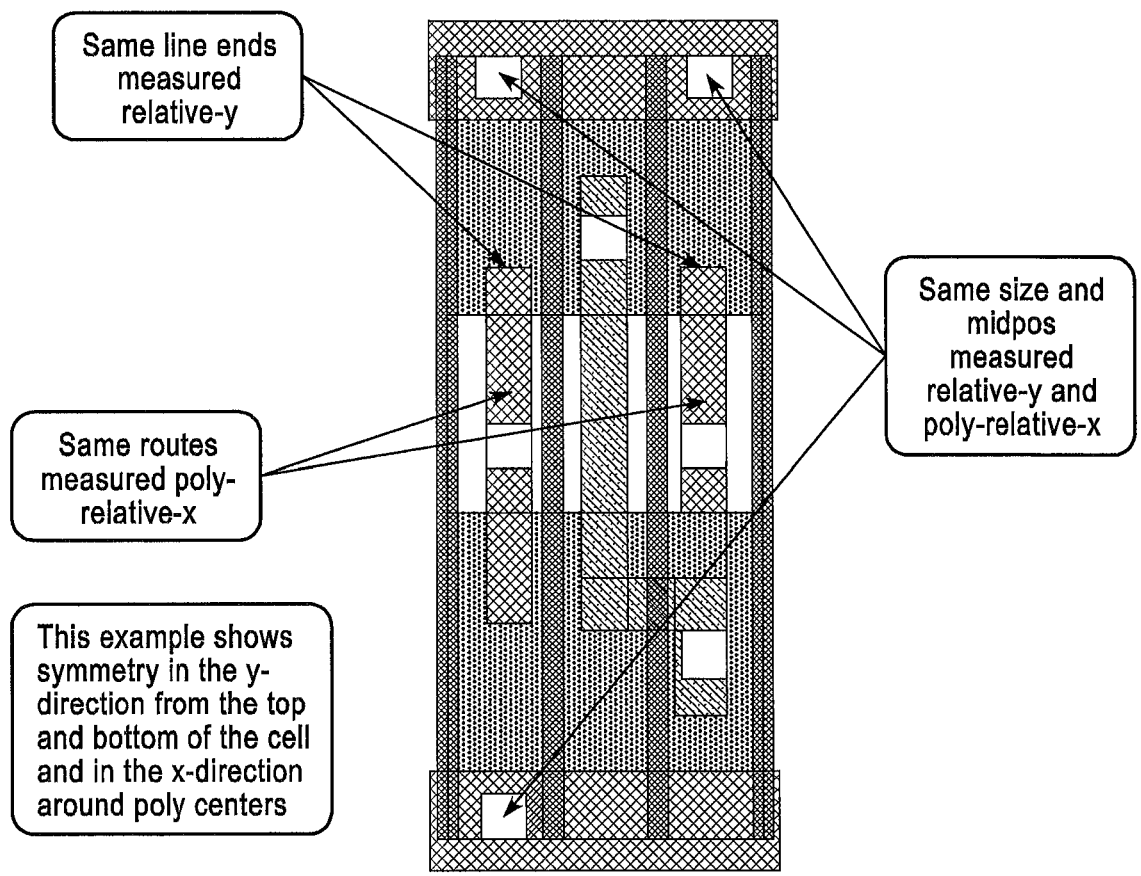
FIG. 11 illustrates pattern matches being determined by the style of measurement.

FIG. 11: Pattern matches are determined by the style of measurement. For example, for via positions measured x-polyrelative and y-relative, the positions of two vias are considered to be the same if each via is the same distance from its closest via and each via is the same distance from either the top or bottom edge of the cell.

Figure 12:
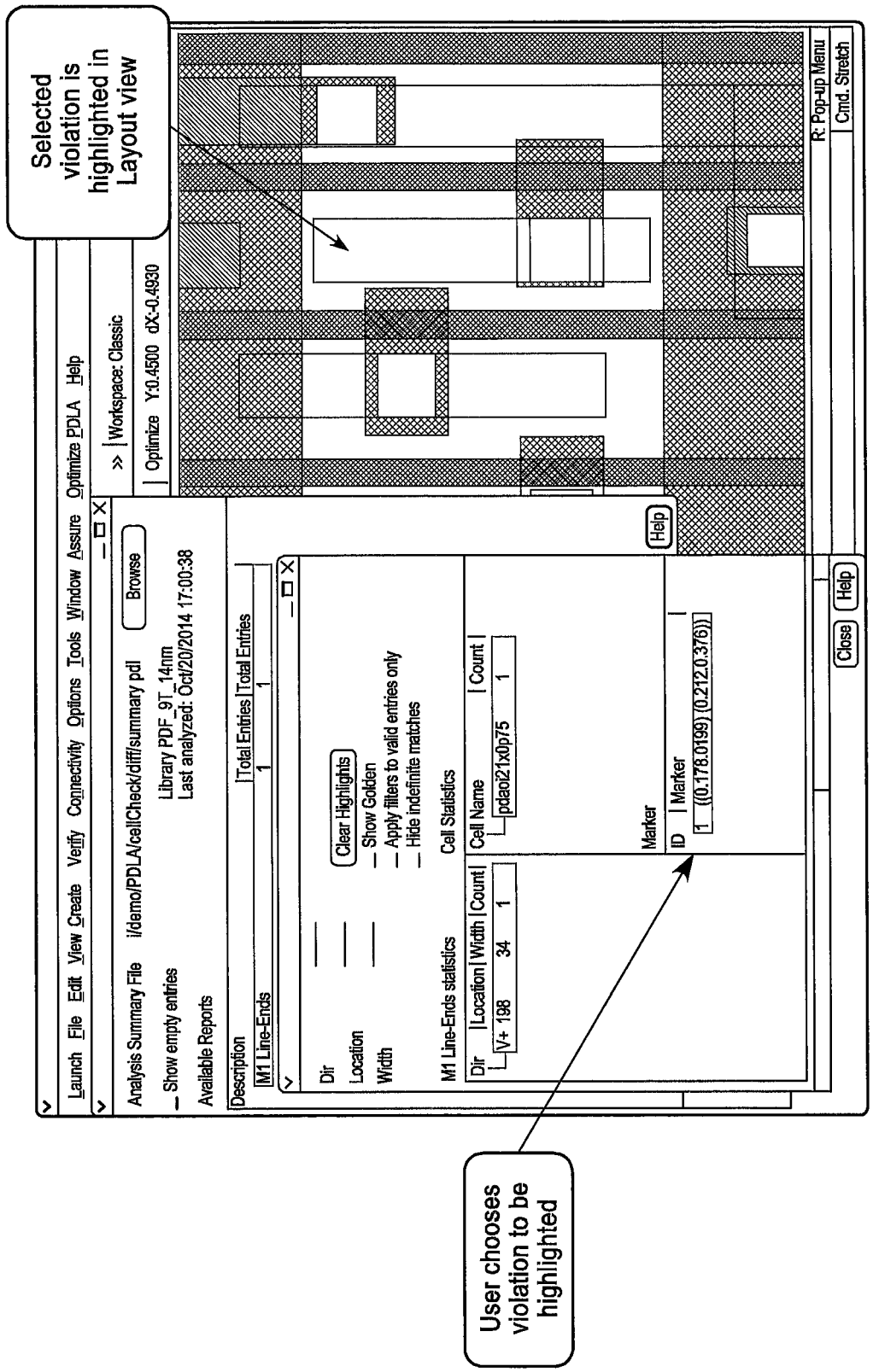
FIG. 12 illustrates differences between a cell under development and the Template Architecture.

FIG. 12: Templatyzer highlights differences between a cell under development and the Template Architecture. Templatyzer extracts patterns from each new cell according to the same template definition as was used to analyze the golden library. It compares the newly extracted patterns against the Template Architecture. New patterns are flagged for review.

Figure 13:
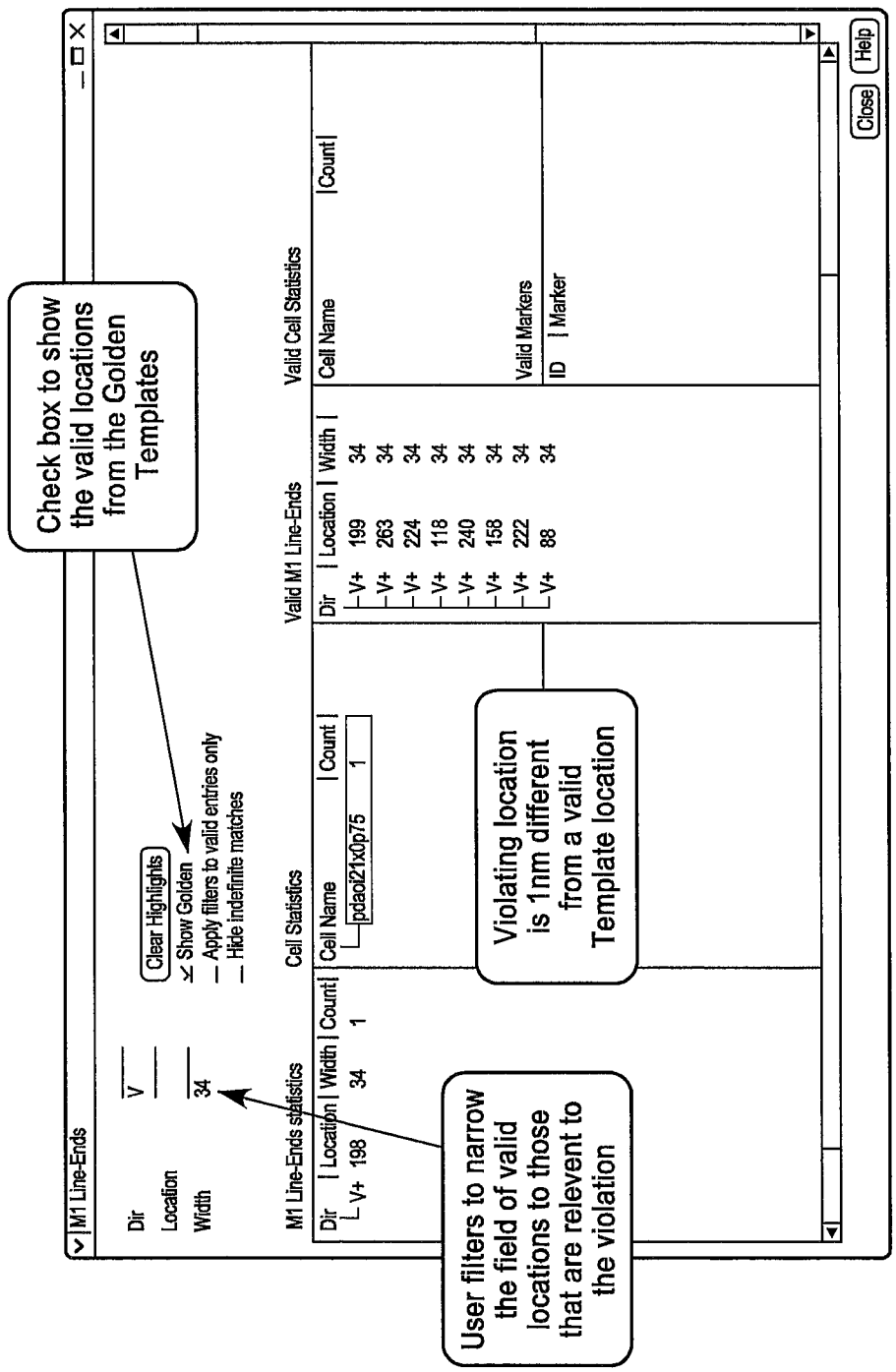
FIG. 13 illustrates the display of similar valid patterns relative to a particular invalid pattern.

FIG. 13: Templatyzer displays similar valid patterns. In addition to flagging unmatched patterns in a new cell, Templatyzer will also display valid patterns from the golden library for comparison.

Figure 14:
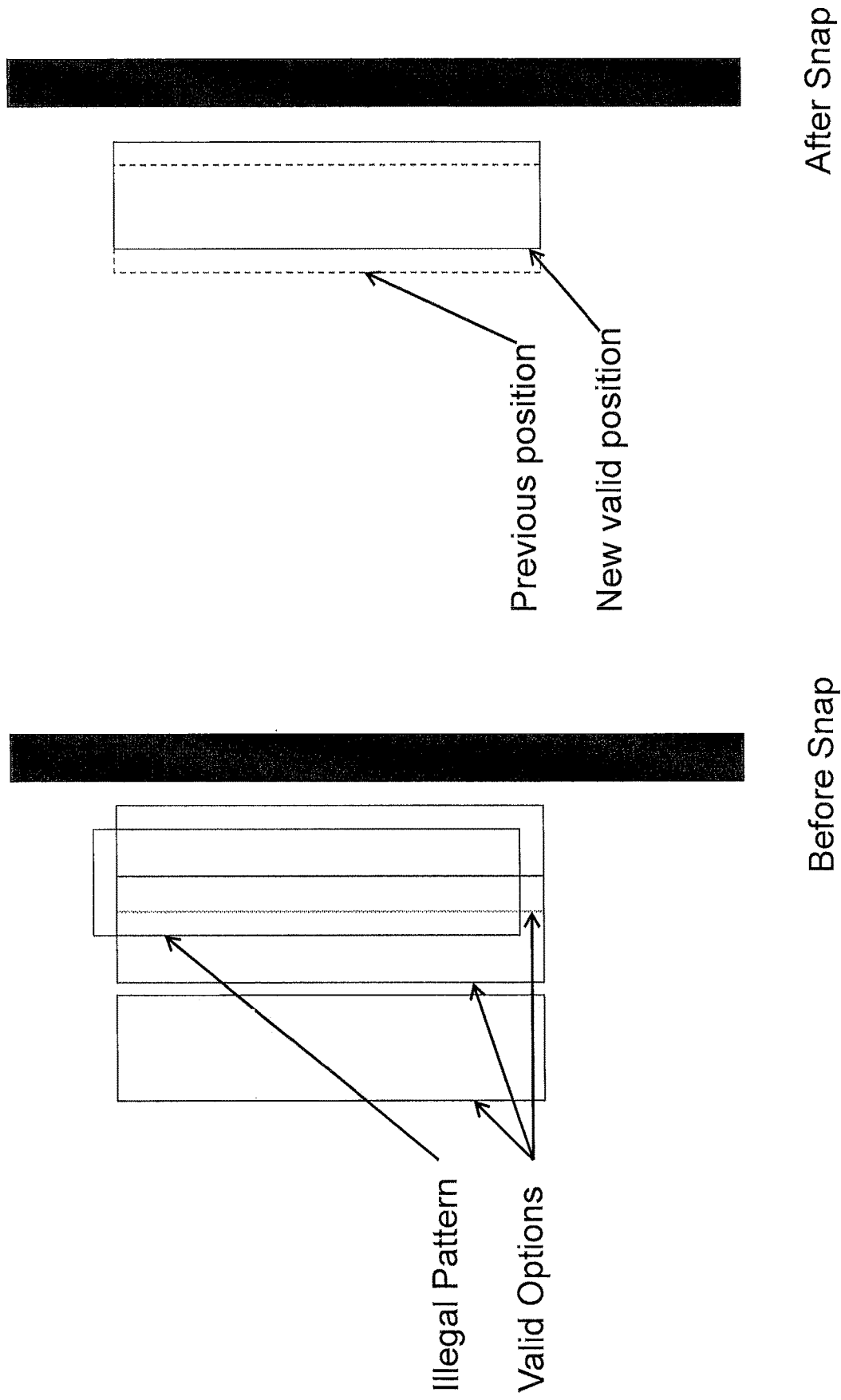
FIG. 14 illustrates snapping an invalid pattern into the closest valid position.

FIG. 14: Templatyzer snaps an invalid pattern into the closest valid position. The user may instruct Templatyzer to snap unmatched patterns to the closest valid patterns. The user has the option of filtering out undesired valid patterns prior to snapping.

Illustrated in FIG. 14 is the general concept of placing an illegal pattern into a position that is valid—in this case where the size of the pattern is legal already, and the movement of the pattern to a valid location of edges and corners.

In a preferred embodiment, each snap-to is performed individually, and an option whether to accept or reject is presented to the user. Other embodiments, such as automatically performing the snap-to operation for all illegal patterns is possible as well.

Figure 15:
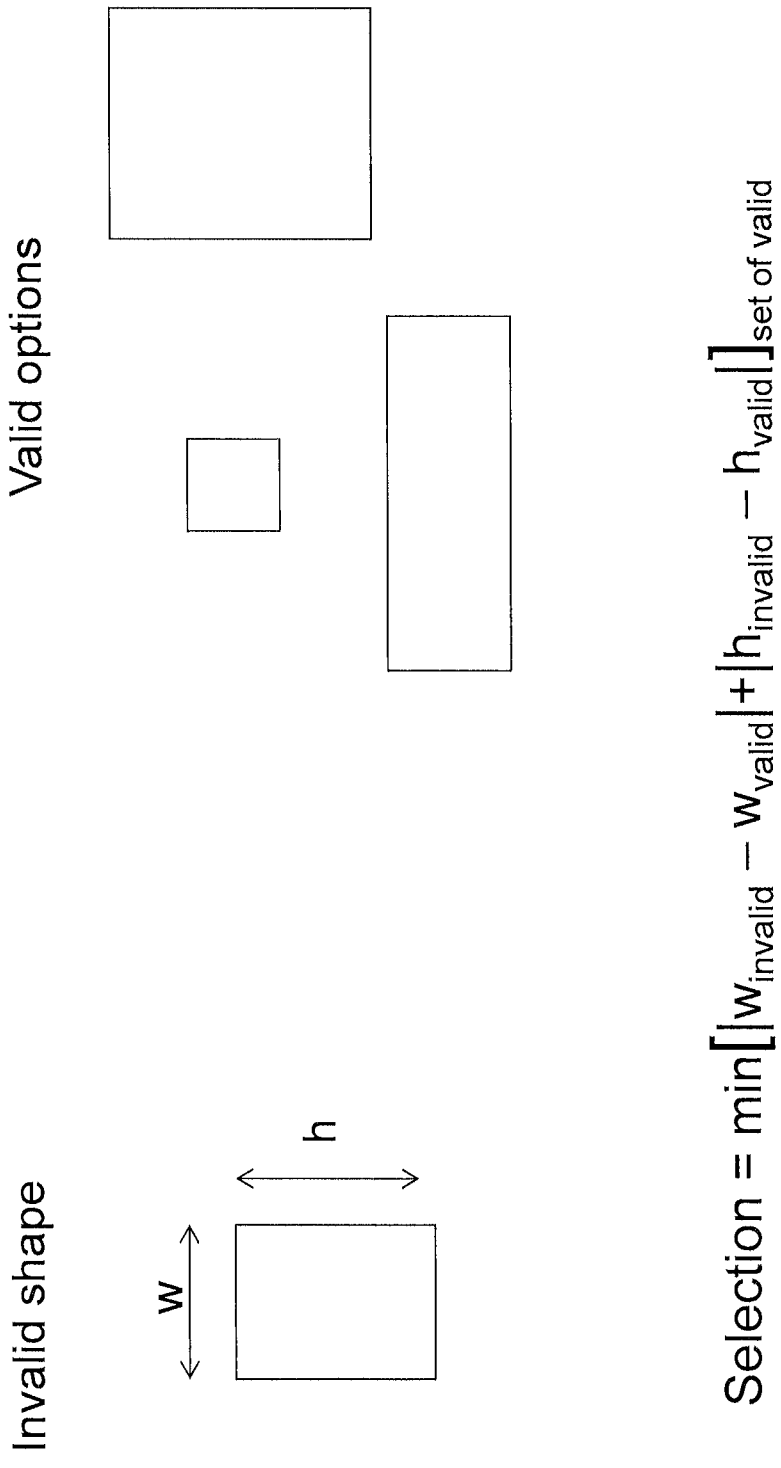
FIG. 15 illustrates choosing a valid size pattern by minimizing the sum of the width difference and height difference.

FIG. 15: The best Template match is chosen from the valid options. The best match is determined as the target with the minimum difference between the given pattern and the valid pattern. In the case of SIZE, shown in FIG. 15, the difference between the width and height of the patterns is minimized, so as to obtain a valid shape from an invalid shape. The illustrated invalid and valid options are exaggerated for illustrative purposes; as usually there will be valid sizes fairly similar to each other that can be implemented. Note that with respect to size, it is only permissible to swap one shape for another one shape, size is coupled with the notion of the mid-point of the shape.

Figure 16:
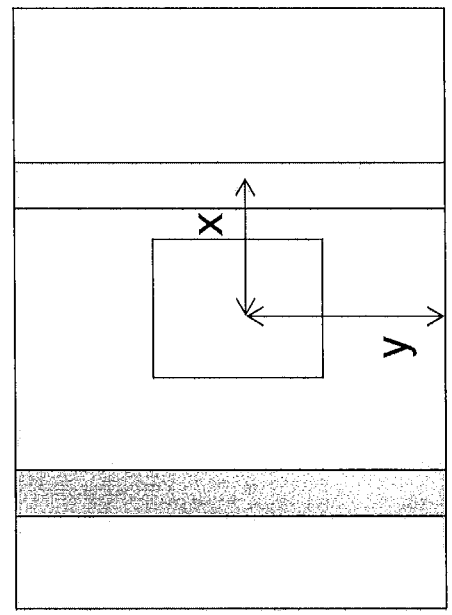
FIG. 16 illustrates choosing a valid position pattern by minimizing the position difference.

FIG. 16: In the case of position, referred to as "POS," the sum of the differences between the X and Y positions is minimized, where position is taken from a center of the object. Typically, after size is decided, then position is decided, and an iteration can occur if necessary, which iteration can occur in steps and each presented to the user, or automatically.

Figure 17:
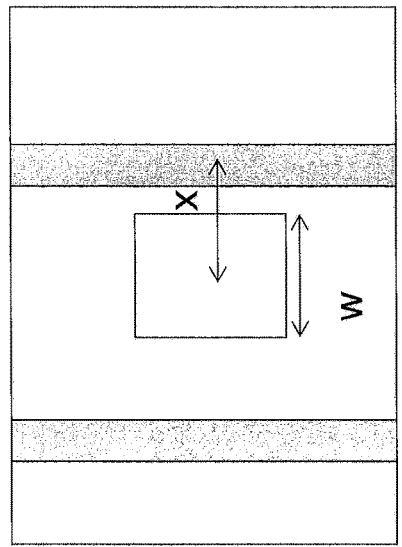
FIG. 17 illustrates choosing a valid route pattern according to width and center-line position.

FIG. 17: In the case of ROUTE, reduce the selection set to those valid patterns with matching widths if any exist. Then minimize the center-line distance.

Figure 18:
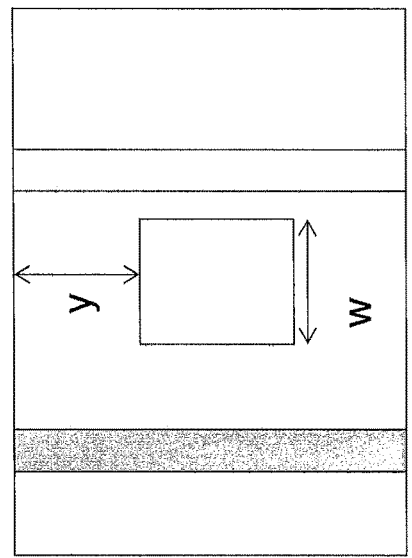
FIG. 18 illustrates choosing a valid line end pattern according to width and short-end position.

FIG. 18: In the case of LINE END, reduce the selection set to those valid patterns with matching widths if any exist. Then minimize the distance between the invalid line end and the valid line end.

Figure 19:
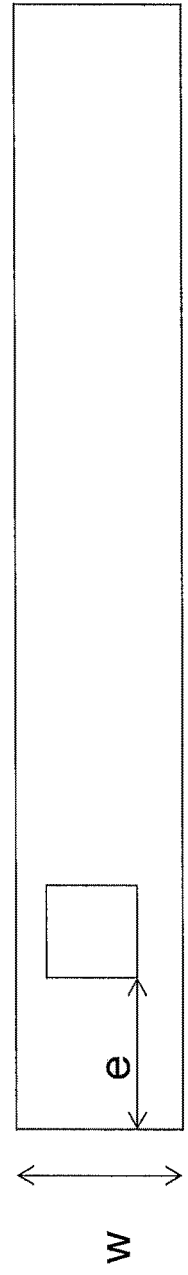
FIG. 19 illustrates choosing a valid extension pattern according to width, location and extension.
Figure 20:
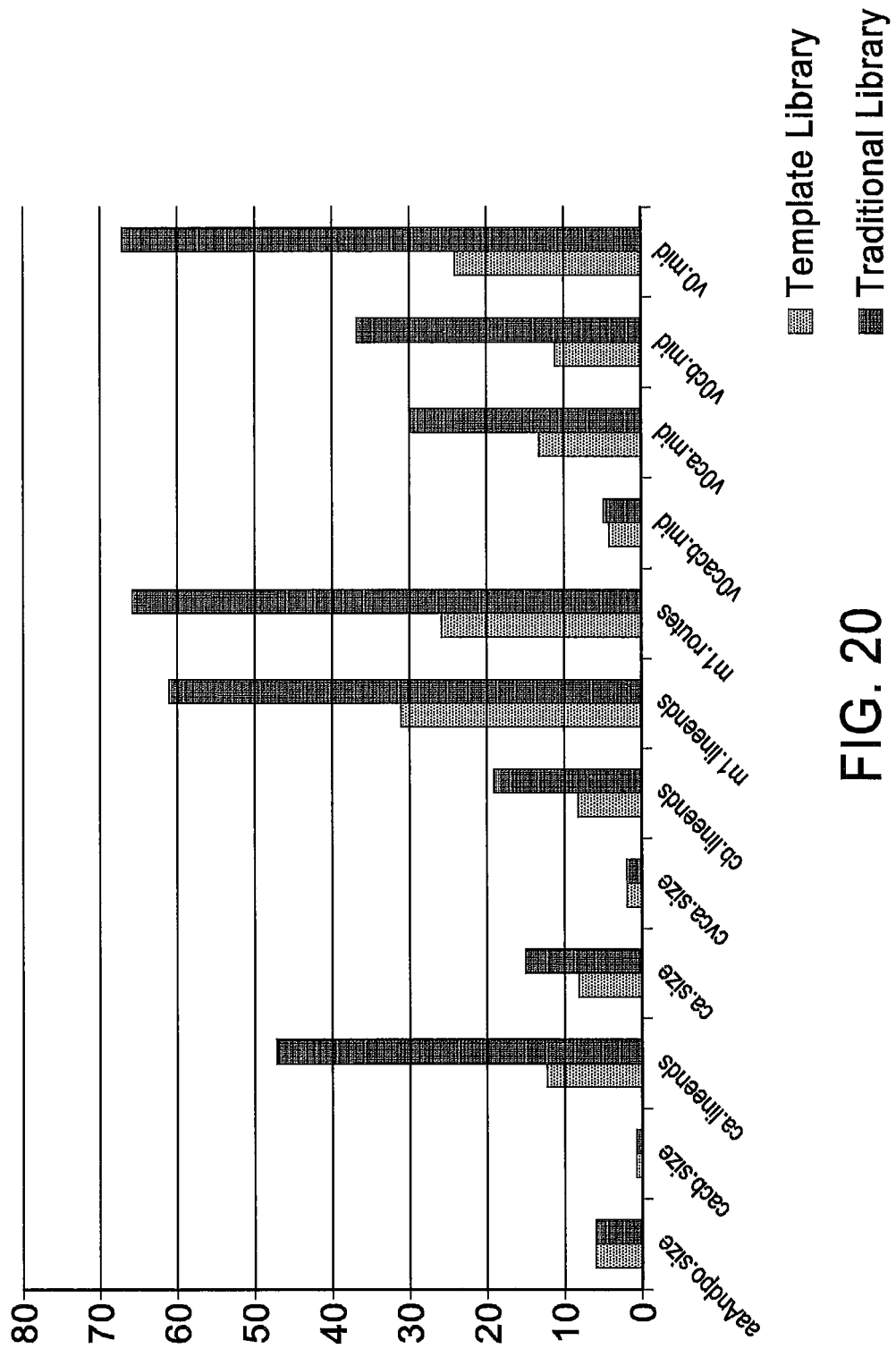
FIG. 20 illustrates reduction of pattern counts based upon the embodiments described.

FIG. 19: In the case of EXTENSION, reduce the selection set to those valid patterns with matching widths if any exist. Choose a valid size and position for the enclosed shape according to available patterns. Then minimize the difference of the distance between the enclosing and enclosed edges of the invalid enclosure and the valid line enclosure.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures.

We claim:

1. A method of creating a snap-to instruction for forming at least one physical pattern on one of a plurality of layers in a semiconductor integrated circuit, the method comprising the steps of:
   determining a plurality of golden cell valid patterns, the plurality of golden cell valid patterns defined by data and wherein the plurality of golden cell valid patterns contain every allowable pattern; and
   creating a snap-to instruction that automatically alters an invalid pattern defined by other data into a valid pattern based upon at least one of the plurality of golden cell valid patterns, the snap-to instruction determining a valid size and a valid position that approximates an invalid size and an invalid position of the invalid pattern, wherein the valid pattern includes at least a valid size and a valid position, the snap-to instruction including a snap-to valid via pattern instruction that provides for a valid extension of a valid via pattern, wherein the valid extension includes a valid distance of an enclosing shape that surrounds a via pattern.

2. The method according to claim 1 further including a snap-to route instruction that provides for a valid route, wherein the valid route includes a valid width and a valid long axis position.

3. The method according to claim 1 further including a snap-to valid line end instruction that provides for a valid line end, wherein the valid line end includes a valid width and a valid short end position.

4. The method according to claim 1 further including a snap-to valid size instruction that provides for a valid size, wherein the valid size includes a valid height and a valid width.

5. The method according to claim 1 further including a snap-to valid position instruction that provides for a valid position, wherein the valid position includes a valid size and a valid X,Y position.

6. The method according to claim 1, further including a snap-to valid enclosure instruction that provides for a valid enclosure corresponding to the enclosing shape, wherein the valid enclosure includes three shortest distances from the valid via pattern to the enclosing shape.

7. The method according to claim 1, wherein determining a plurality of golden cell valid patterns includes determining a specification of one or more types of patterns of interest, the one or more types of patterns comprising a subset of the plurality of golden cell valid patterns.

8. The method according to claim 1, wherein extension and/or enclosure patterns are distinguished by the x,y position of the center of the shape, and wherein position patterns can be coupled with size patterns thereby fully characterizing a rectangle of a given layer.

9. The method of claim 1 further comprising the step of, subsequent to determining a plurality of golden cell valid patterns, filtering out one or more undesired valid patterns among the plurality of golden cell valid patterns.

10. The method of claim 1, wherein the valid pattern is chosen from amongst a plurality of valid patterns based on selecting a target pattern among the plurality of valid patterns having a minimum difference between the invalid pattern and the valid pattern.

* * * * *